US011183845B2

(12) United States Patent
Weindl et al.

(10) Patent No.: US 11,183,845 B2
(45) Date of Patent: Nov. 23, 2021

(54) METHOD, COMPUTER PROGRAM PRODUCT, DEVICE, AND ENERGY CLUSTER SERVICE SYSTEM FOR MANAGING CONTROL TARGETS, IN PARTICULAR LOAD BALANCING PROCESSES, WHEN CONTROLLING THE SUPPLY, CONVERSION, STORAGE, INFEED, DISTRIBUTION, AND/OR USE OF ENERGY IN AN ENERGY NETWORK

(71) Applicant: Siemens Aktiengesellschaft, Munich (DE)

(72) Inventors: Christian Weindl, Coburg (DE); Ivana Mladenovic, Seukendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 197 days.

(21) Appl. No.: 16/318,553

(22) PCT Filed: Jul. 18, 2017

(86) PCT No.: PCT/EP2017/068102
§ 371 (c)(1),
(2) Date: Jan. 17, 2019

(87) PCT Pub. No.: WO2018/015376
PCT Pub. Date: Jan. 25, 2018

(65) Prior Publication Data
US 2019/0267808 A1 Aug. 29, 2019

(30) Foreign Application Priority Data
Jul. 18, 2016 (DE) .................... 10 2016 213 080.3

(51) Int. Cl.
*G05B 19/042* (2006.01)
*H02J 3/28* (2006.01)
(Continued)

(52) U.S. Cl.
CPC .............. *H02J 3/28* (2013.01); *G05B 19/042* (2013.01); *H02J 3/382* (2013.01);
(Continued)

(58) Field of Classification Search
CPC .... H02J 3/28; H02J 3/382; H02J 3/003; H02J 3/14; G05B 19/042; G05B 2219/2639; Y04S 20/222
See application file for complete search history.

(56) References Cited

U.S. PATENT DOCUMENTS 8,682,495 B2 * 3/2014 Carralero ............... G05B 15/02
700/286
2010/0217550 A1 * 8/2010 Crabtree ................. H02J 3/005
702/62
(Continued)

FOREIGN PATENT DOCUMENTS

DE 102014217930 A1 3/2016

OTHER PUBLICATIONS

A-H Mohsenian-Rad et al: "Optimal and autonomous incentive-based energy consumption scheduling algorithm for smart grid", Innovative Smart Grid Technologies (ISGT), 2010 IEEE, Piscataway, NJ, USA, Seiten 1-6, XP031650357, ISBN: 978-1-4244-6264-3 Seite 1-Seite 5; Abbildung 1 Zusammenfassung; 2010; Non-English PCT Search Report for PCT/EP2017/068102 dated Nov. 2, 2017.

*Primary Examiner* — Gary Collins
(74) *Attorney, Agent, or Firm* — Schmeiser, Olsen & Watts LLP

(57) ABSTRACT

Managing control targets, in particular, load balancing processes, when controlling the supply, conversion, storage, feed, distribution, and/or use of energy in an energy network if the increasing, volatile, dynamic, decentralized, local feed and/or storage of electric energy leads to loads at different network connection levels of the energy network to control the energy supply so efficiently and sustainably that load balancing processes resulting from occurring load deviations for example are supported locally and reduced regionally and/or across network connection levels. Provided are hierarchical and network-oriented energy clusters formed within network connection levels of the energy network, and in the process, the expenditure of energy and the local exchange of energy within energy clusters are localized across clusters and/or across network connection levels via a voluntary and incentivized participation in an energy cluster service which manages the control targets in the energy network.

13 Claims, 4 Drawing Sheets

(51) Int. Cl.
 *H02J 3/38* (2006.01)
 *H02J 13/00* (2006.01)
 H02J 3/14 (2006.01)
 H02J 3/00 (2006.01)

(52) U.S. Cl.
 CPC .. *H02J 13/0017* (2013.01); *G05B 2219/2639* (2013.01); *H02J 3/003* (2020.01); *H02J 3/14* (2013.01); *Y04S 20/222* (2013.01)

(56) References Cited

U.S. PATENT DOCUMENTS

| | | | |
|---|---|---|---|
| 2014/0297206 A1 | 10/2014 | Silverman | |
| 2014/0343983 A1* | 11/2014 | Narayan | G06Q 10/04 705/7.12 |
| 2017/0005515 A1* | 1/2017 | Sanders | H02J 3/32 |
| 2017/0256908 A1 | 9/2017 | Lehmann et al. | |

* cited by examiner

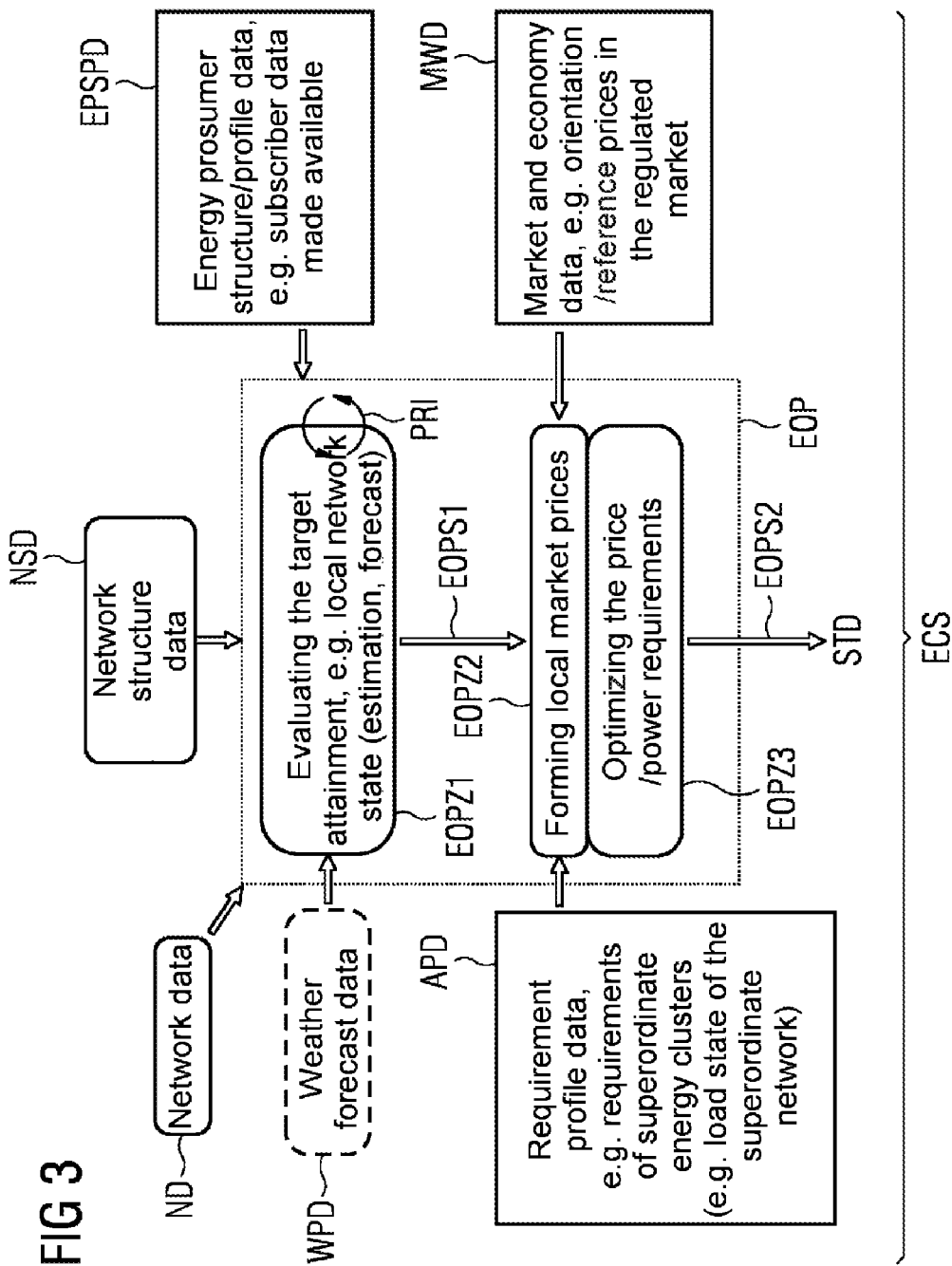

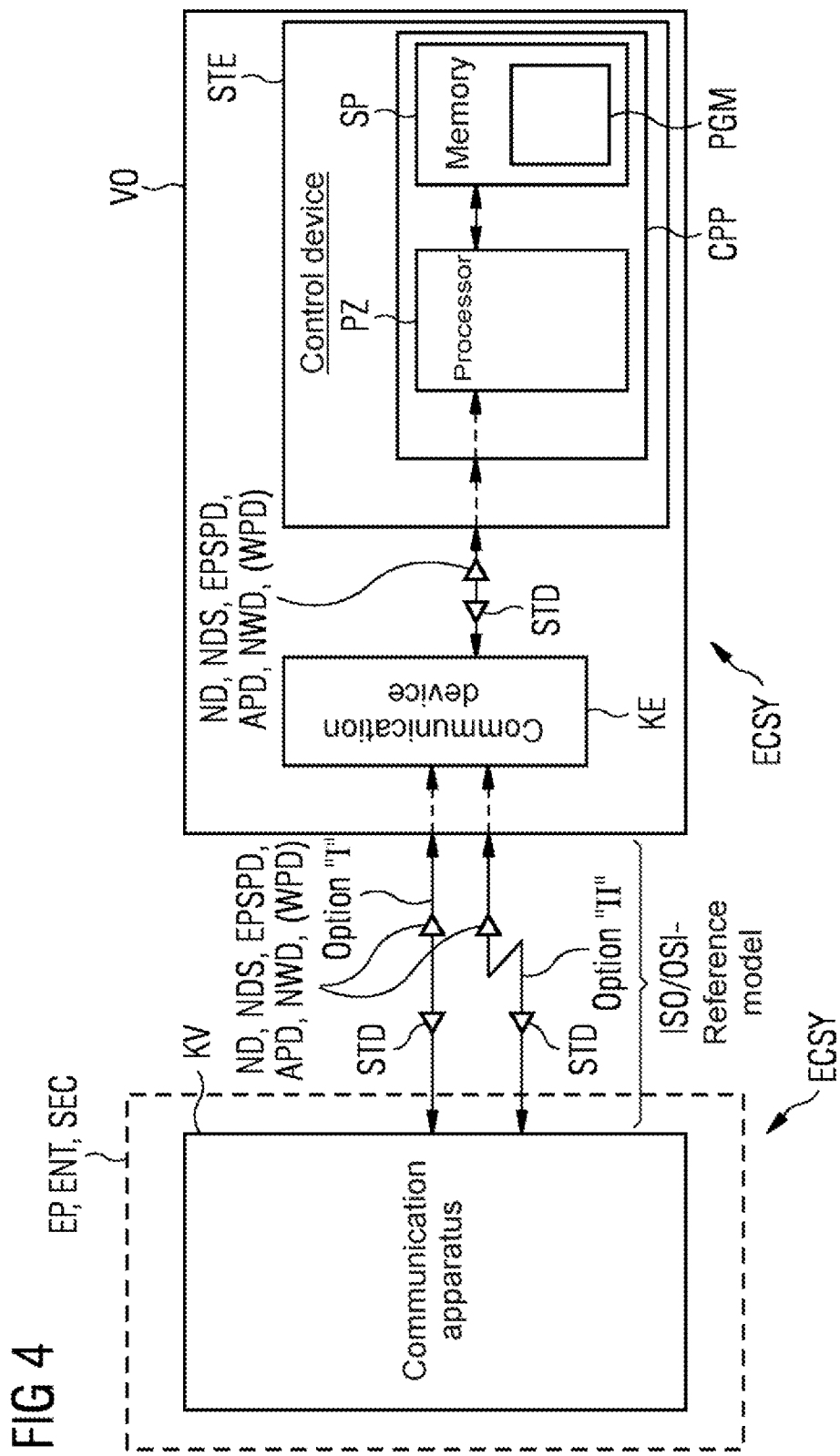

METHOD, COMPUTER PROGRAM PRODUCT, DEVICE, AND ENERGY CLUSTER SERVICE SYSTEM FOR MANAGING CONTROL TARGETS, IN PARTICULAR LOAD BALANCING PROCESSES, WHEN CONTROLLING THE SUPPLY, CONVERSION, STORAGE, INFEED, DISTRIBUTION, AND/OR USE OF ENERGY IN AN ENERGY NETWORK

CROSS-REFERENCE TO RELATED APPLICATIONS

This application claims priority to PCT Application No. PCT/EP2017/068102, having a filing date of Jul. 18, 2017, based off of German Application No. 10 2016 213 080.3, having a filing date of Jul. 18, 2016, the entire contents both of which are hereby incorporated by reference.

FIELD OF TECHNOLOGY

The following relates to a method for managing control targets, in particular load balancing processes, when controlling the supply, conversion, storage, infeed, distribution and/or consumption of energy in an energy network, a computer program product (non-transitory computer readable storage medium having instructions, which when executed by a processor, perform actions) for managing control targets, in particular load balancing processes, when controlling the supply, conversion, storage, infeed, distribution and/or consumption of energy in an energy network, an apparatus for managing control targets, in particular load balancing processes, when controlling the supply, conversion, storage, infeed, distribution and/or consumption of energy in an energy network in, and an "energy cluster service" system for managing control targets, in particular load balancing processes, when controlling the supply, conversion, storage, infeed, distribution and/or consumption of energy in an energy network.

BACKGROUND

The control of the supply, conversion, storage, infeed, distribution and/or consumption of energy in an energy network has been a topic much discussed among experts (thus e.g. inter alia in connection with smart grid technology) at least in Germany since the announcement regarding Germany's Energiewende [Energy transition], according to which production of electricity in nuclear power plants is intended to be abandoned by 2022. Furthermore, for a relatively long time now there has been a trend in plans with the aim of superseding energy generation from fossil primary energy, such as gas and coal, for example, largely by renewable energy sources, such as e.g. wind and solar energy, in stages by 2050. Information and communication technology plays an important part here for the successful integration of wind and solar energy into a future energy system. Furthermore, there are state interventions, such as the German Renewable Energy Sources Act (EEG) regarding use, as a matter of priority, of electricity generated in a renewable fashion and trade with emission certificates in order to reduce greenhouse gas emissions, which firstly increase competition in the energy market and secondly introduce the transition from a central to a decentralized and from a conventional to a renewable energy generating structure. In this case, the attributes "renewable, decentralized and fluctuating" are the ones which pose major challenges for Germany's Energiewende. In this regard, the change to renewable energies, such as wind and solar energy, actually goes hand in hand with electricity generation subject to fluctuations. The supply of electricity, which may fluctuate greatly on account of the growing proportion of offshore/onshore wind farms and photovoltaic (PV) installations, must be reconciled with a likewise varying demand, e.g. by harmonizing supply and demand.

What is furthermore problematic is that a significant portion of the supply of electricity originates from decentralized infeed, wherein wind farm or PV installations feed into the distribution network. It is this increasing and increasingly volatile decentralized infeed of electrical energy, within the distribution network, but also in superordinate network levels, which crucially results in the increasing occurrence of electricity backfeed from the lower network voltage levels. In contrast thereto, in earlier energy networks in which the energy was fed in according to a top-down approach, there was a flow of electricity that ran exclusively from high to low voltage. On account of such a bidirectional electricity circulation, it is absolutely imperative to adapt the infrastructure of the energy network.

Furthermore, owing to the substantial lack of possibilities or readiness for load management of consumers (Demand Side Management) and generators and the modest energy storage possibilities in the network, it can therefore happen that, firstly, bottlenecks, local overloads, violations of predefined voltage bands occur and, secondly, accelerated aging of operating equipment takes place and there is also the need for network reinforcements and network expansion.

As a result of the altered generating structure and the crucial incorporation of energy feeders into lower network levels or network connection levels, besides the vertical utilization of the network, a horizontal utilization of the energy system, which is not provided and designed for such a utilization, occurs increasingly cyclically as a result of a photovoltaic infeed (PV infeed) in the event of intense insolation and a wind energy infeed in the event of strong wind.

The consequences for network loading, network operation and structural development are:
existing network structures are still required;
an increased operating equipment loading in subnetworks;
an additional network expansion is required, although for relatively short utilization times;
an incomplete detection of the network state and of the capacity utilization of the operating equipment by existing measuring devices at the medium-voltage/high-voltage level (MV/HV level);
stock market-oriented pricing carried out centrally serves crucially for compensation of the control power in the balancing group.

The abovementioned consequences for network loading, network operation and structural development then give rise to the following problems:
an extent of required capital expenditure for predominantly horizontal network utilization cannot be determined with hard and fast rules and is greatly dependent on network topology and utilization;
stock market-oriented pricing carried out centrally does not reflect the local, possibly high, network capacity utilizations and the network benefit of control power;
stock market-oriented use of locally available control power [e.g. by electrical stores, controllable consumers, Power-to-X, prosumers (Neologism: Producer and Consumer)] may aggravate the occurrence of local overload situations,
accelerate the need for network expansion, and
even before the stock market-oriented use of locally available control power, considerably reduce the possible capacity utilization duration or the remaining life of operating equipment as a result of high degrees of capacity utilization.

The following example is mentioned to illustrate this:

<<Active feedback of local energy stores/control power at underfrequency in an "ENTSO-E" area (European Network of Transmission System Operators for Electricity) in conjunction with high local infeed of renewable generators>>. This has the following consequences:

considerable acceleration of the aging of operating equipment as a result of high degrees of capacity utilization→reduction of expected lifetimes;

increased maintenance costs and need for action in the area of asset management.

The problems presented and explained above in the course of controlling the supply, conversion, storage, infeed, distribution and/or consumption of energy in an energy network have been handled in such a way that the supply security, the system reliability and the stability have been crucially ensured centrally by the (large) power plants contained in an interconnected system and the network levels or network connection levels superordinate to the local systems.

SUMMARY

Embodiments of the invention include a method, a computer program product, an apparatus and an "energy cluster service" system for managing control targets, in particular load balancing processes, when controlling the supply, conversion, storage, infeed, distribution and/or consumption of energy in an energy network, wherein, if loadings at different network connection levels of the energy network occur as a result of the increasing, volatile, dynamic, decentralized, local infeed and/or storage of electrical energy, with the management of the control targets or the load balancing processes, the energy supply is controlled so efficiently and sustainably that, for example, load balancing processes as a result of load fluctuations that occur are both locally promoted and reduced regionally and/or across network connection levels.

The concept underlying embodiments of the invention is that hierarchical and network-oriented energy clusters are formed within network connection levels of an energy network in conjunction with the localization of the energy application and the local energy exchange within an energy cluster, across clusters and/or across network connection levels, by way of a voluntary and incentive-motivated participation in an "energy cluster service (ECS)" which manages the control targets, in particular the load balancing processes, in the energy network and which enables a local assessment of energies and powers to be fed in or drawn, said assessment taking account of the network capacity utilization and also the costs of further services.

A specific market modeling (e.g. by the network operator) is used to promote the balancing within the energy clusters and to reduce the load balancing from superordinate energy clusters, as a result of which expansion costs, increased maintenance costs and costs owing to the lifetime of operating equipment being spent in an accelerated manner are shifted or avoided.

This is achieved specifically with regard to a method for an energy network having a multiplicity of network connection levels, wherein each of the latter:

a) is coupled indirectly or directly to a power market for the supply, conversion, storage, infeed, distribution and/or consumption of energy, in particular of regional energy obtained centrally and/or of local energy obtained in a decentralized manner, b) has at least one energy cluster having in each case at least one energy prosumer which is suitable for technical communication in the energy cluster and which does at least one of two things: (i) produces, in particular generates and emits or acquires, stores and re-emits, local energy obtained in a decentralized manner and (ii) consumes local or regional energy, and the supply, conversion, storage, infeed, distribution and/or consumption of energy within the energy cluster are/is effected across clusters and/or across network connection levels between the energy cluster and the power market, by virtue of the fact that 1) in the course of an "energy cluster service (ECS)" for at least one self-organizing energy cluster with in each case the at least one energy prosumer, which, with regard to the "energy cluster service (ECS)", is an energy network subscriber and/or a sub-energy cluster which is contained in the self-organizing energy cluster and is interlinked with the latter in terms of communication technology, on the basis of an energy-prosumer-related incentive-supply model for the energy prosumer participating therein in each case a cluster-specific energy-prosumer-related evaluation/¬optimization is carried out, 2) the evaluation/optimization is carried out such that the energy cluster behaves actively with regard to each evaluation/¬optimization to be carried out in the energy network, in a network-oriented and network-useful manner, in particular with the aim of stabilizing network operation, and 3) the evaluation/optimization is carried out in such a way that, in the sense of an open-loop-controlled, closed-loop-controlled, target-oriented and/or self-learning principle, in particular dynamically and substantially continuously, communicated network data and network structure data of the energy network, "energy prosumer" structure/profile data from the participating energy prosumer in the self-organising energy cluster, requirement profile data of superordinate energy clusters and energy-specific market and economy data are evaluated for the generation of supply-/incentive-oriented control data.

The procedure pursued for this purpose encompasses:

a reduction of the powers and energies to be transmitted with the aim of limitation here to what is physically necessary;

localization of the energy application and of the power balancing, with the respective objective (e.g. as respective long-term goal):

a partial autonomy of network regions at different network connection levels;

network operation serves predominantly to provide necessary services (e.g. balancing the residual load, stability, supply security, etc.).

In this case, a solution approach used is an "energy cluster service (ECS)" having the following attributes:

Network structure-oriented operation:

System-support operation of electrical energy stores, controllable loads, feeders and prosumers located within a region already at the subnetwork level.

Open system:

Self-determined, active participation in a locally network-usefully oriented use behavior motivated by the local market and incentive models.

Cluster concept 1:

Hierarchically organized clusters of energy users reflecting the network structure can be used for the localization of the energy exchange.

Cluster concept 2:

Freely definable clusters of energy users distributed arbitrarily in the network can achieve their own superordinate objectives (e.g. participation in the control energy market, 1 MW limit).

Power balancing and power management:

Incentive regulation by means of market formation that reflects the network structure, i.e. local supply-, demand- and network-benefit-based market formation.

Automation and use control:

Automation of the local subscriber management within the energy clusters (e.g. agent systems); intervention options (e.g. network operators) for pursuing superordinate objectives (local network capacity utilization and stability, supporting the network frequency, reactive power management, system services, etc.).

Increasing the network stability:

If necessary direct and selective intervention in the network use of active subscribers by the network operator in the event of local overload and jeopardization of network stability (e.g. voluntary, possibly remunerated participation in shedding scenarios).

Reflecting the network levels:

A hierarchical structuring and mode of operation of the energy clusters make it possible to achieve substantial automation across a plurality of network levels (subordinate clusters report their requirement to superordinate clusters and in return receive necessary modifications of subscriber management).

Integrateability and extendibility:

The "energy cluster service (ECS)" is integrateable into traditionally operated networks homogenously whilst maintaining the advantages initiated within the subnetworks and in the overall system. The system advantages increase with the number of participating energy users.

The advantages and options that emerge therefrom or in this case are:

Active participation promoted by incentives, that is to say incentive-motivated and supply-controlled participation, in local energy management and provision of control energy and network services, without central control externally (e.g. by interventions in external installations, security);

with a reduction of jeopardization resulting from cyber attacks;

without costly installation and evaluation of central system observers with measurement locations distributed in the network;

without required participation (voluntary participation) in the "energy cluster service (ECS)", wherein if a communication disturbance occurs, the subscriber falls back on own (internal) optimization goals (fallback on sub scriber-specific/sub scriber-individual optimization goals).

Market- or remuneration-motivated (incentives) voluntary participation of the providers wherein own optimization goals can be taken into account in the "energy cluster service (ECS)";

e.g. own requirement optimization of the PV use is carried out by "simply storing energy (EES)";

e.g. there is the need to introduce or continue production processes;

e.g. a present state of charge, charging requirement or discharging requirement of a battery system can be taken into account on the basis of characteristic variables;

there is the possibility of deriving local, regional and national market methods and management methods;

a shutdown desirable from the viewpoint of the network is enabled by the subscriber;

an external emergency shutdown by external locations/entities (e.g. the network operator) is compatible.

A hierarchical assignment of the "energy cluster service (ECS)" in a manner following the network levels or network connection levels with a supply of "energy cluster service (ECS)" outputs in accordance with the use of the networks;

a localization of the energy application and the possibility for reducing the energy exchange with superordinate network connection levels/energy clusters;

avoiding/reducing overload situations;

an optimized use of available renewable energies in existing network structures;

an integration or partial integration of the "energy cluster service (ECS)" proceeding from energy microclusters right into higher network connection levels where regular network operation is possible;

a minimization of losses in the network.

An optimization of network use in order to avoid network reinforcement and network expansion on the basis of the NORE principle (network optimization before reinforcement before expansion);

by deriving network-oriented, local, technically and economically expedient market models;

with real-time data available from information as far as the operating equipment level for analyzing the state of networks and subnetworks;

with long-term usability of the information for state-oriented maintenance and for orientation of the asset management strategy;

with financing of the incentives by opening up cost potentials in operation and in asset management.

Illustration of the "energy cluster service (ECS)" solution approach in light of the resulting advantages and options on the basis of an application scenario in an "energy microcluster at the low-voltage level":

Family A would like to dry a drum of laundry. The dryer (subscriber 1) reports in the microcluster (virtually low-voltage outgoer at the ON transformer) a requirement of 3 kWh energy at a power of approximately 1.5 kW, which ought to be made available as of now within a time window of 6 h.

The energy store of family B (subscriber 2) determines, on the basis of forecast data of the domestic photovoltaic installation, that it will make available this power, the required power and energy, locally within the LV supply taking account of the supply situation within the cluster and the superordinate stipulations of the network operator.

Consequence:

The power exchange results in no additional loading for the superordinate network, fewer overall losses and no necessity for network expansion. By comparison with a stock market-oriented mode of operation, the capacity utilization and the operating equipment consumption or that is to say the aging of the system components decrease.

BRIEF DESCRIPTION

Some of the embodiments will be described in detail, with reference to the following figures, wherein like designations denote like members, wherein:

FIG. 3 shows a structure and flow diagram for the implementation of the "energy cluster service (ECS)"; and FIG. 4 shows the construction of a system for realizing the "energy cluster service (ECS)".

DETAILED DESCRIPTION

Figure 1:
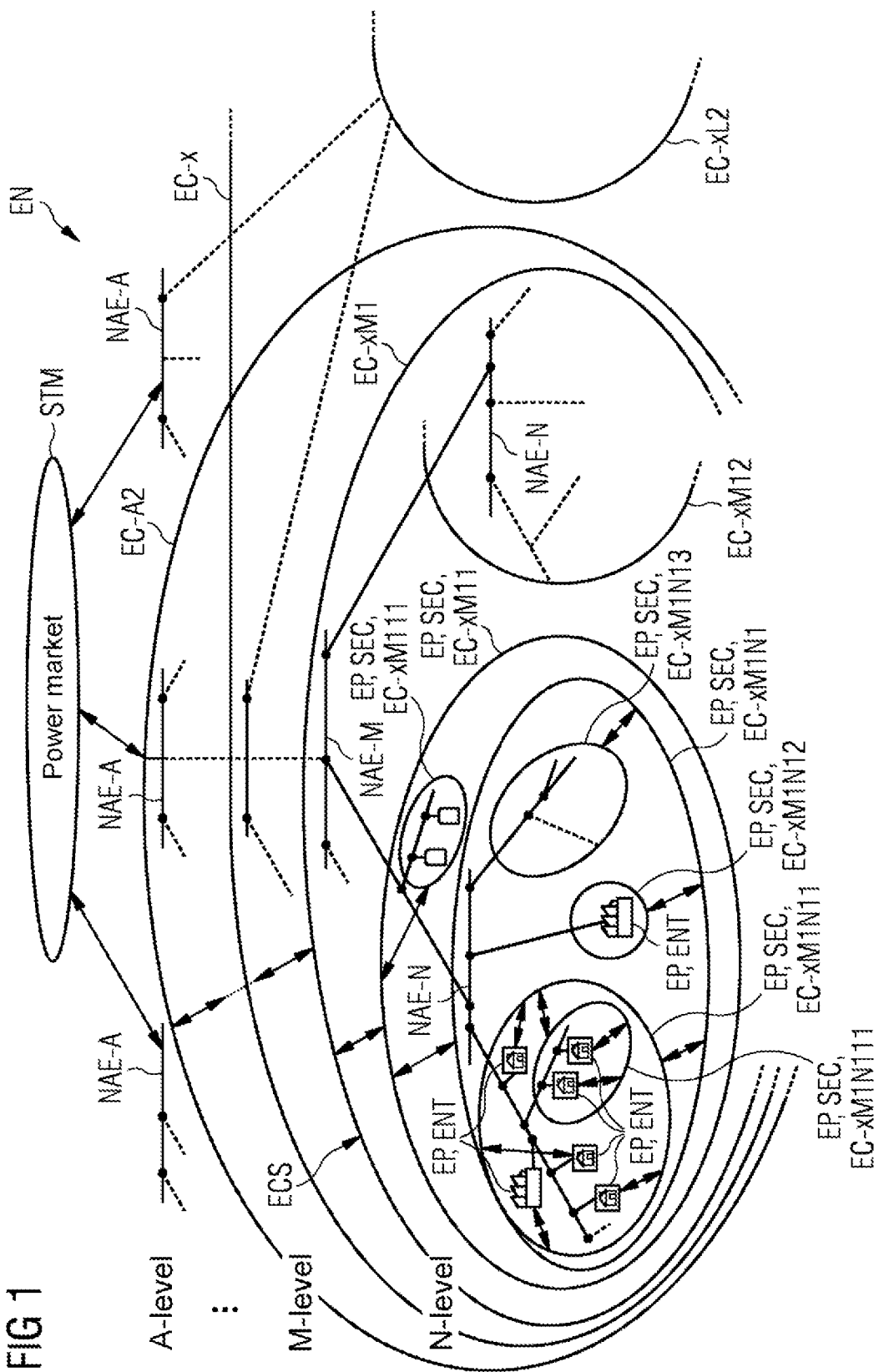
FIG. 1 shows a basic schematic diagram of a hierarchically structured energy network for realizing an "energy cluster service (ECS)"

FIG. 1 shows a basic schematic diagram of a hierarchically structured energy network EN for realizing an "energy cluster service" ECS. With this "energy cluster service" ECS, when controlling the supply, conversion, storage, infeed, distribution and/or consumption of energy in the energy network EN, the intention is to manage control targets, such as e.g. and load balancing processes, in the energy network EN. Managing substantially includes evaluating/optimizing by means of an evaluation/optimization process specifically designed and configured for this purpose. How this process is manifested, functions and is implemented in detail will be explained later in association with the description of FIGS. 3 and 4.

The energy network EN illustrated in FIG. 1 comprises a multiplicity of network connection levels NAE-A, . . . NAE-M, NAE N, which are coupled either indirectly or directly to a power market STM in each case for the supply, conversion, storage, infeed, distribution and/or consumption of energy. The network connection levels NAE-A, . . . NAE-M, NAE-N, which are positioned by definition at levels from A to N in an energy network representation, are often also referred to as network levels. The network connection levels NAE-A, . . . NAE-M, NAE-N each contain at least one energy cluster. In this regard, in accordance with the illustration in FIG. 1, at the A-level, by definition as the first level after the power market STM, there is an energy cluster EC-A2 directly connected to the power market STM. Below the A-level from the viewpoint of the power market STM, an x-arbitrary level contains an x-arbitrary energy cluster EC-x, which is connected to the power market STM indirectly inter alia via the energy cluster EC-A2 and which contains two subordinate energy clusters, specifically an energy cluster EC-xL2 at the L-level and an energy cluster EC-xM1 at the M-level. The latter, with regard to the "energy cluster service" ECS to be realized, is a self-organizing energy cluster EC-xM1 with in each case at least one energy prosumer EP suitable for technical communication in the energy cluster EC-xM1. Said energy prosumer produces local energy obtained in a decentralized manner, wherein producing can take place or is effected by generating and emitting or else by acquiring (e.g. by commercial purchasing), storing and "re-emitting", and/or the energy prosumer EP consumes local or regional energy made available in the energy network EN.

The supply, conversion, storage, infeed, distribution and/or consumption of energy in the energy network EN are/is effected in principle within the respective energy cluster EC-A2, EC-x, EC-xM1, EC-xL2, across clusters and/or across network connection levels between the energy cluster EC-A2, EC-x, EC-xM1, EC-xL2 and the power market STM.

However, not only the self-organizing energy cluster EC-xM1 but also the other energy clusters EC-A2, EC-x, EC-xL2 contain the energy prosumer(s) EP, even though this is not explicitly illustrated in FIG. 1. The same also applies to the "energy cluster service" ECS to be realized on the basis of a self-organizing energy cluster. In this regard, without any limitation, it is also possible, even though the illustration in FIG. 1 in this respect is restricted exclusively to the self-organizing energy cluster EC-xM1, for the other energy clusters EC-A2, EC-x, EC-xL2 also to be considered for this purpose.

The at least one energy prosumer EP of the self-organizing energy cluster EC-xM1 is an energy network subscriber ENT and/or a sub-energy cluster SEC which is contained in the self-organizing energy cluster EC-xM1 and is interlinked with the latter in terms of communication technology. In this context, interlinked means that the sub-cluster SEC is arranged strictly hierarchically at the same level as or a different level than the energy cluster EC-xM1. In this regard, in accordance with the illustration in FIG. 1, a hierarchically subordinate sub-energy cluster EC-xM11, a hierarchically subordinate sub-energy cluster EC-xM12 and a hierarchically subordinate sub-energy cluster EC-xM111 are arranged at the M-level, that is to say the same level as the self-organizing energy cluster EC-xM1, and a hierarchically subordinate sub-energy cluster EC-xM1N1, a hierarchically subordinate sub-energy cluster EC-xM1N11, a hierarchically subordinate sub-energy cluster EC-xM1N12, a hierarchically subordinate sub-energy cluster EC-xM1N13 and a hierarchically subordinate sub-energy cluster EC-xM1N111 are arranged at the N-level below the M-level (from the viewpoint of the power market STM). With the exception of the hierarchically subordinate sub-energy cluster EC-xM12 at the M-level, all hierarchically subordinate sub-energy clusters are crucial for the "energy cluster service" ECS to be realized and the illustration in this respect in FIG. 1. However, this in turn does not mean (as already mentioned in association with the other energy clusters EC-A2, EC-x, EC-xL2) that the hierarchically subordinate sub-energy cluster EC-xM12 is unsuitable for the "energy cluster service" ECS. On the contrary, the opposite is true (it is just not explicitly illustrated in FIG. 1).

Figure 2:
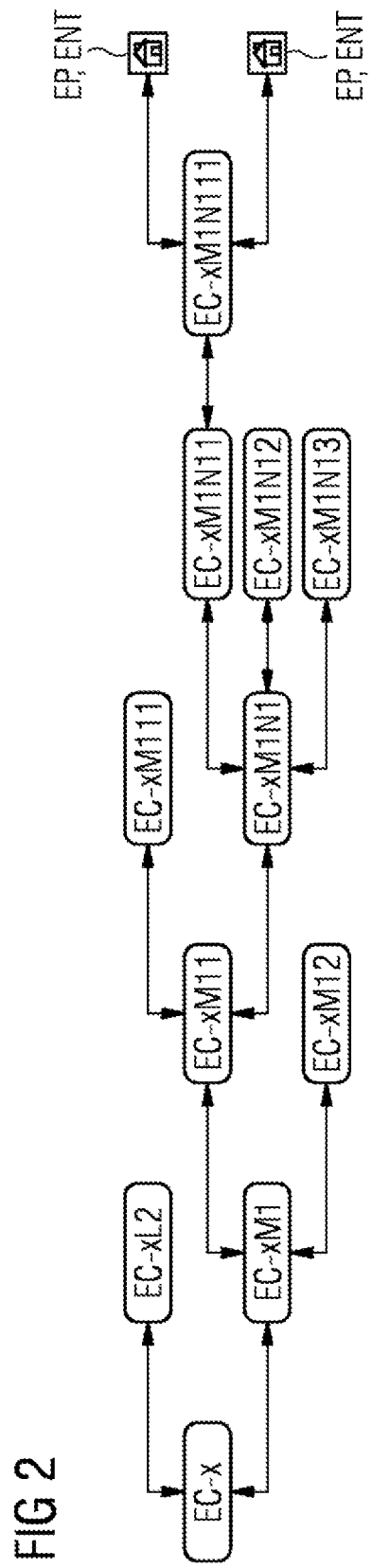
FIG. 2 shows a tree diagram with regard to energy clusters for realizing the "energy cluster service (ECS)"

The way in which the individual sub-energy clusters EC-xM11, EC-xM12, EC-xM111, EC-xM1N1, EC-xM1N11, EC-xM1N12, EC-xM1N13, EC-xM1N111 are then interlinked with regard to the self-organizing energy cluster EC-xM1 and the other energy clusters EC-x, EC-xL2 is shown with reference to FIG. 2 in the shape of a tree diagram.

The functioning of "energy cluster service" ECS will now be outlined below with reference to FIG. 1:

The information exchange between the energy prosumers EP, ENT, SEC, EC-xM11, EC-xM111, EC-xM1N1, EC-xM1N11, EC-xM1N12, EC-xM1N13, EC-xM1N111 (referred to as "subscribers" in the outline hereinafter) participating in the "energy cluster service" ECS is represented by double-headed arrows.

The subscribers within the relevant energy clusters SEC, EC-xM11, EC-xM111, EC-xM1N1, EC-xM1N11, EC-xM1N12, EC-xM1N13, EC-xM1N111 (sub-energy clusters in a self-organizing energy cluster) are represented in the form of a circular and elliptic area.

Each subscriber and energy cluster has a communication unit, as is shown in FIG. 4 and the functioning of which will then be explained in connection with the description of FIG. 4. In one exemplary embodiment, the respective communication unit both on the "energy prosumer" side and on the "energy cluster" side enables an Internet access or has an Internet connection, which can also be an existing, private Internet connection on the basis of the communication types and methods used (as explained later in connection with the description of the FIGURE). The subscriber does not necessarily have a separate, dedicated measuring location or measuring unit, but has its own unique signature which uniquely identifies said subscriber with regard to participation in the "energy cluster service" ECS. This identification can be compared with an IP address.

Each subscriber registers once for participation in the "energy cluster service" ECS with its specific consumer, consumption, generation and storage data, capacities and further subscriber information (e.g. address and possibly fundamental characteristic curves, etc.), which are subsumed under "energy prosumer" structure data (cf. FIG. 3). In this case, it is left to each subscriber whether the latter takes account only of its essential "energy prosumer" components, which, on account of their technical properties, are already equipped metrologically and in terms of control engineering (e.g. PV installations, storage systems, home automation components, controllable industrial components and installations, etc.), or whether said subscriber uses a metrological solution that detects the connection (e.g. on the basis of a smart meter or energy gateways, etc.).

If only part of the installation technology is detected (e.g. taking account of only the PV installation and the storage system for a private household), then it is possible, by means of a more extensive assignment to standardized consumer or "energy prosumer" profile data (cf. FIG. 3), to achieve a further improvement in the estimation of the (average present) load or infeed behavior, without this necessitating a complex and cost-intensive central interrogation of the subscriber behavior by means of a smart meter (by the subscriber itself or a central detection facility).

Each self-organizing energy cluster EC-xM1 includes at least one energy network subscriber ENT and/or sub-energy clusters SEC, EC-xM11, EC-xM111, EC-xM1N1, EC-xM1N11, EC-xM1N12, EC-xM1N13, EC-xM1N111. Energy clusters EC-xM1, SEC, EC-xM11, EC-xM111, EC-xM1N1, EC-xM1N11, EC-xM1N12, EC-xM1N13, EC-xM1N111 can be established arbitrarily taking account of the network structure and can thus be network-useful in a targeted manner given suitable assignment (e.g. by the network operator).

In this case, pursuing control targets within the energy clusters is accomplished by means of an incentive-supply model, i.e. within local and hierarchically intermeshing market systems. What is advantageous here is that, in the case of the "energy cluster service" ECS, customers' installations are not actively influenced externally, but rather are merely guided in an incentive-based manner to reach their own decision (e.g. withdrawing energy from a battery storage system in the event of a deficiency of active power in the local subnetwork). The direct interventions in customers' installations by the network operator, which are critical from a technical and primarily a legal standpoint in normal operation, are thus obviated (incl. consequences in respect of legal liability).

Owing to the voluntary incentive-motivated (e.g. cost- or remuneration-driven) participation by the subscribers in the "energy cluster service" ECS and the resulting active supply of amounts of energy or powers and the temporal retrieval thereof (incentive-motivated and supply-controlled participation), in subscriber communication it is possible in principle to have recourse to existing Internet connections of the subscribers. In this case, each subscriber can itself stipulate what information it will make available at what time within the "energy cluster service" ECS. If necessary, following the model of online banking methods, it is possible for the communication to be safeguarded in a key-based manner in order to preclude a system-relevant intervention by third parties.

Since all data are offered or supplied to the server systems of the "energy cluster service" ECS by the subscribers themselves, there is in turn no need for customers' data to be accessed externally (e.g. by the network operator) in a manner that is critical from a business and, under certain circumstances, legal standpoint.

The detection of the loading and load situation of a subnetwork can already be improved by individual subscribers located in this subnetwork since additional information concerning the (quasi-) present loading behavior is made available. By using the incentive-supply model, it is possible in the same way, even already with a small number of subscribers, to counteract overload situations (e.g. battery charging and discharging management, PV power reduction, control of industrial installations, etc.).

The energy clusters, besides primary control targets (e.g. stabilizing local networks), can also be useful for supporting other kinds of control targets (e.g. reaching relevant power limits for participation in the power market, etc.). For this purpose, even subscribers, clusters or sub-clusters that are distributed in the network can be coupled in terms of registration, control and/or data technology. The actual control of the subscribers is then overlaid on the possibly plurality of incentives in a way that makes overlaid optimization goals achievable in the best way.

The optimization goals within the entire energy network EN or parts thereof are achieved by the operation of the hierarchically structured "energy cluster service" ECS by virtue of the fact that the network levels likewise follow a hierarchical mapping/integration, by application of local control targets within the energy clusters.

Possible optimization goals and control targets are:

balancing/reducing the powers required by superordinate network levels;

reducing the load flow into superordinate network levels;

localizing the energy application;

reducing the losses in operating equipment and parts of the network levels;

prolonging the lifetime and economic viability of operating equipment;

reducing maintenance and renovation costs;

optimizing the integration of renewable/volatile feeders and loads;

avoiding or temporally shifting network expansion, reinforcements and network extensions;

optimizing the available network services (e.g. voltage stability, frequency stability, network restoration, short-circuit power, etc.);

stabilizing network operation;

increasing the degree of autonomy of the supply.

Furthermore, (optionally) weather forecast data can also be incorporated for (short-term) influencing of subscriber behavior (cf. FIG. 3).

For calculating the network states, recourse is had to also already existing measuring systems and information and also the information made available by the subscribers (present power exchange and possible load shifts and storage options). As the number of subscribers increases, the state determination and the forecast at the "energy cluster service" ECS will improve significantly.

In this case, the calculation systems for necessary information processing can be accommodated in a decentralized manner and in principle independently of the network structure or else locally e.g. in transformer stations or substations.

However, server farms stationed nationally (e.g. on the part of the network operator) are also possible in the same way. In this case, each (redundant) server system can accept the information and the control of a plurality of (numerous) clusters.

The security of the "energy cluster service" ECS can be significantly increased by means of redundant server systems.

In the event of a failure of the "energy cluster service" ECS, the subscribers either return to the "normal", i.e. non-supply-oriented, passive behavior or else wait for restoration of the ECS system in accordance with predefined rules. If said system is not available, the load behavior within the network merely returns to that of a non-service-guided network. By means of local rules and the logic of the subscribers, however, as it were passive optimizations are possible here, which e.g. can also enable network load relief at peak times.

The subscribers or energy clusters can inter alia also participate directly in the power market. The participation conditions should be determined in an up-to-date manner by associated energy clusters taking account of the local network state, in order to avoid disadvantages resulting from high network capacity utilizations.

The subscribers (end consumers) inform their own cluster services, e.g. in the sub-energy cluster EC-xM1N111, about the available positive or negative power, energy and the time period in which this power can be made available.

The cluster service in the sub-energy cluster EC-xM1N111 evaluates the state of the network region encompassed by it on the basis of the presently communicated power data of the subscribers associated with it. The power data are beneficial here even in the case of an incomplete power detection (e.g. power of PV installation, power of store and merely assumed power of a standard household) since significantly more information than in present-day networks is available in this way. It is furthermore advantageous that the data are provided voluntarily and in an incentive-motivated manner by the subscribers without further cost-intensive communication structures.

Taking account of the requirements of the superordinate sub-energy cluster EC-xM1N11—or recursively of the hierarchically superordinate energy clusters—the cluster service in the sub-energy cluster EC-xM1N111 derives offers in the form of technical releases and/or in the form of monetary incentives, e.g. related to a present or an average basic price of power. Either at regular time intervals or else depending on their power and storage states, the subscribers participating in the sub-energy cluster EC-xM1N11 actively interrogate the offered releases and/or monetary incentives at the cluster service and for their part derive suitable measures depending on their technical states (e.g. storage state, etc.), report them to the superordinate cluster service and implement them.

The optimum or non-optimum time intervals for interrogating the offers or releases of the superordinate cluster service or for determining the own offers are derived from technical conditions (state of the subscriber or of the sub-energy cluster EC-xM1N11, capacity utilization, storage states, etc.).

Besides pure technical releases (e.g. permissibility of switching actions), incentives may be monetary surcharges and/or deductions relative to present stock market-based power prices or else technically derived corrected power prices that already take account of the network structure.

In the case of the hierarchically structured "energy cluster service" ECS, this gives rise to price structures taking account of the present capacity utilization state and the offer from top to bottom across the network levels. In this case, the network structure and the rising service requirements in subordinate network levels lead to a "natural" and technically commensurate increase in price for an energy exchange in lower network levels (assuming a "uniform" capacity utilization structure). In the case of local overload situations, a shift in the power budget likewise already occurs locally and, in an incentive-driven manner, counteracts the increased (local) capacity utilization by means of a suitable activation of the subscribers.

Subordinate energy clusters, e.g. the sub-energy cluster EC-xM1N111, hierarchically inform superordinate energy clusters, e.g. the sub-energy cluster EC-xM1N11, about available positive or negative power, energies and the period of time in which these powers are available. In this way, the powers and energies available for balancing are made available globally in steps.

This is repeated in the course of the realization of the "energy cluster service" ECS across all participating, hierarchically interlinked energy clusters; thus from the sub-energy cluster EC-xM1N11 to the sub-energy cluster EC-xM1N1, then from the sub-energy cluster EC-xM1N1 to the sub-energy cluster EC-xM11 and finally from the sub-energy cluster EC-xM11 to the energy cluster EC-xM1. In this way, the control power required in the entire interconnected system can be made available in an incentive-motivated manner in clusters which are suitable with regard to the local network loading, i.e. in a manner distributed in the network and inter alia also in a network-useful manner.

In this way, the "energy cluster service" ECS enables an optimized use of the energy network EN and a reduction of the maximum loads or infeeds. The amount of energies to be transmitted decreases as a result of the local power balancing.

The integration of superordinate or local load and weather forecast data or the profiles thereof makes it possible to extend the system in the form of correspondingly adapted offers and incentives. In addition, these data can be made available to the subscribers via the "energy cluster service" ECS in order to further optimize the decision criteria for participation taking account of suitable stipulations and/or technical states.

The "energy cluster service" ECS opens up far-reaching automation options for localizing the energy applications, for homogenizing the load flows and thus for reducing necessary network reinforcements or expansion measures.

FIG. 3 shows a structure and flow diagram for the implementation of the "energy cluster service" ECS. The central entity for this implementation is an evaluation/optimization process EOP hosted in the energy cluster EC-xM1 and/or the sub-energy cluster SEC, EC-xM11, EC-xM111, EC-xM1N1, EC-xM1N11, EC-xM1N12, EC-xM1N13, EC-xM1N111, by means of which evaluation/optimization process, on the basis of an energy-prosumer-related incentive-offer model for energy prosumers EP, ENT, SEC, EC-xM11, EC-xM111, EC-xM1N1, EC-xM1N11, EC-xM1N12, EC-xM1N13, EC-xM1N111 participating in the "energy cluster service" ECS in the self-organizing energy cluster EC-xM1, a cluster-specific energy-prosumer-related, network-oriented and network-useful, e.g. with the aim of stabilizing operation in the energy network EN in accordance with FIG. 1, evaluation/optimization is carried out. This evaluation/optimization process EOP for this purpose involves passing through three evaluation/optimization process states, a first evaluation/optimization process state EOPZ1, a second evaluation/optimization process state EOPZ2 and a third evaluation/optimization process state EOPZ3, in the stated order.

In the first evaluation/optimization process state EOPZ1 of the evaluation/optimization process EOP, by means of the evaluation of network data ND and network structure data NSD of the energy network EN, and also "energy prosumer" structure/profile data EPSPD from the participating energy prosumer EP, ENT, SEC, EC-xM11, EC-xM111, EC-xM1N1, EC-xM1N11, EC-xM1N12, EC-xM1N13, EC-xM1N111 in the energy cluster EC-xM1, which include e.g. subscriber data made available, an evaluation of the target attainment, e.g. of the local network state, is carried out in the form of estimation and forecast, dynamically with changing data and substantially continuously, in the sense of an open-loop-controlled, closed-loop-controlled, target-oriented and/or self-learning principle PRI.

A self-learning principle is understood to mean a closed-loop control method which uses specific input variables and taking account of neural networks, fuzzy logic and further methods.

An evaluation/optimization based on this principle is based on the local decision criteria given within the energy cluster concerning the technically and/or economically optimized or improved operation of the networks and operating equipment within the energy cluster, the optimizations and improvements resulting from the hierarchical integration and gradation of the energy cluster within the hierarchically interlinked system of energy clusters and the optimizations and improvements resulting therefrom for the network structure.

Besides local measurement variables made available and the information resulting from the realization/implementation of the "energy cluster service" ECS, and also the superordinate power, load flow and cost data, data originating from load flow calculations and analyses and also network state estimations can be used for this purpose.

Optionally, in the first evaluation/optimization process state EOPZ1 of the evaluation/optimization process EOP, weather forecast data WDP can also be taken into account for the evaluation explained.

The evaluation result obtained is a depiction of necessary measures, e.g. network-useful requirements made of the participating energy prosumers EP, ENT, SEC, EC-xM11, EC-xM111, EC-xM1N1, EC-xM1N11, EC-xM1N12, EC-xM1N13, EC-xM1N111.

Said evaluation result is processed further in a first evaluation/optimization process step EOPS1 of the evaluation/-optimization process EOP.

For this purpose, in the second evaluation/optimization process state EOPZ2 of the evaluation/optimization process EOP for forming local market prices, the evaluation result together with the network data ND and the network structure data NSD of the energy network EN, the "energy prosumer" structure/profile data EPSPD of the participating energy prosumer EP, ENT, SEC, EC-xM11, EC-xM111, EC-xM1N1, EC-xM1N11, EC-xM1N12, EC-xM1N13, EC-xM1N111 in the energy cluster EC-xM1, market and economy data MWD, which include e.g. orientation/reference prices in the regular market, and also requirement profile data APD, which include e.g. requirements of superordinate energy clusters for example in the form of the load state of the superordinate network, are evaluated.

In the subsequent third evaluation/optimization process state EOPZ1 of the evaluation/optimization process EOP, an optimization of the price/power requirements is carried out using the local market prices formed beforehand.

Offer-/incentive-oriented control data STD are obtained as optimization result, these data being present in a second evaluation/optimization process step EOPS2 of the evaluation/optimization process EOP for further use.

FIG. 4 shows the construction of a system for realizing the "energy cluster service" ECS, this system being referred to as "energy cluster service" system ECSY. The "energy cluster service" system ECSY contains an apparatus VO for managing the control targets or the load balancing processes when controlling the supply, conversion, storage, infeed, distribution and/or consumption of energy in the energy network EN in accordance with FIG. 1, and a communication apparatus KV. The apparatus VO and the communication apparatus KV are connected to one another for data transfer and form a common functional unit for managing the control targets or the load balancing processes.

The apparatus VO is configured as a server arranged in an interface of the energy network EN, such as e.g. in a network distribution box, a network transformer station or a network substation.

The apparatus VO contains a control device STE containing a computer program product CPP for managing the control targets or the load balancing processes when controlling the supply, conversion, storage, infeed, distribution and/or consumption of energy in the energy network EN in accordance with FIG. 1. The computer program product CPP in turn contains a nonvolatile, readable memory SP, in which processor-readable control program instructions of a program module PGM that carries out the management of the control targets or the load balancing processes and thus also the evaluation/optimization process EOP illustrated in FIG. 3 and described in association therewith are stored, and a processor PZ connected to the memory SP, said processor executing the control program instructions of the program module PGM.

A central element in the apparatus VO for managing the control targets or the load balancing processes or carrying out the evaluation/optimization process EOP is the program module PGM, which is acquirable as APP separately or independently of the apparatus and is uploadable into the control device STE of the apparatus VO and together with the processor PZ and memory SP, which are usually already present in the control device STE, thus forms the computer program product CPP.

Since the apparatus VO configured as a server is located in the network distribution box, the network transformer station or the network substation in the interface of the energy network EN and thus e.g. in the self-organizing energy cluster EC-xM1 and/or the sub-energy cluster SEC, EC-xM11, EC-xM111, EC-xM1N1, EC-xM1N11, EC-xM1N12, EC-xM1N13, EC-xM1N111 in accordance with FIG. 1 and the program module PGM as a constituent of the computer program product CPP formed jointly with the processor PZ and the memory SP in the control device STE of the apparatus VO is crucially responsible for carrying out the evaluation/optimization process EOP, it can justifiably be stated that the evaluation/optimization process EOP is hosted and proceeds centrally in the self-organizing energy cluster EC-xM1 and/or the sub-energy cluster SEC, EC-xM11, EC-xM111, EC-xM1N1, EC-xM1N11, EC-xM1N12, EC-xM1N13, EC-xM1N111.

Furthermore, the apparatus VO also contains a communication device KE, which is connected to the control device STE or the processor PZ. The communication device KE forms a communication interface to the energy prosumer, which communication interface, for a data transfer, for transmitting or receiving data—the network data ND, the network structure data NSD, the "energy prosumer" structure/profile data EPSPD, the requirement profile data APD, the market and economy data NWD, the weather forecast data WPD, the control data STD to or from the energy prosumer, transmits or respectively receives the data ND, NSD, EPSPD, APD, NWD, WPD, STD on a physical layer in accordance with the ISO/OSI reference model on the basis of a point-to-point connection in a line-based fashion (option "I"), e.g. via a metallic line or a fiber-optic cable, or via a free space connection (option "II"), e.g. mobile, short-range or satellite communications, and on a network layer and transport layer in accordance with the ISO/OSI reference model on the basis of an end-to-end connection between end systems of a communication network in a circuit-switched or packet-switched fashion, e.g. via the Internet on the basis of an IP/TCP protocol stack.

With regard to the "energy cluster service" system ECSY illustrated in FIG. 4, this means that for the data transfer between the apparatus VO and the communication apparatus KV, which is arranged at or assigned to the energy prosumer EP, ENT, SEC, the data ND, NSD, EPSPD, APD, NWD, WPD, STD are transferred on the physical layer in accordance with the ISO/OSI reference model on the basis of the point-to-point connection in a line-based fashion (option "I"), e.g. via the metallic line or the fiber-optic cable, or via the free space connection (option "II"), e.g. mobile, short-range or satellite communications, and on the network layer and transport layer in accordance with the ISO/OSI reference model on the basis of the end-to-end connection between the end systems of the communication network in a circuit-switched or packet-switched fashion, e.g. via the Internet on the basis of the IP/TCP protocol stack.

In this case, the control device STE and the communication device KE form a common functional unit in such a way that 1) in the course of the "energy cluster service" ECS in accordance with FIG. 3 for the self-organizing energy cluster EC-xM1 with in each case the at least one energy prosumer EP in accordance with FIG. 1, which, with regard to the "energy cluster service", is the energy network subscriber ENT and/or the sub-energy cluster SEC, EC-xM11, EC-xM111, EC-xM1N1, EC-xM1N11, EC-xM1N12, EC-xM1N13, EC-xM1N111 which is contained in the self-organizing energy cluster and is interlinked with the latter in terms of communication technology, on the basis of an energy-prosumer-related incentive-supply model for the energy prosumer EP, ENT, SEC, EC-xM11, EC-xM111, EC-xM1N1, EC-xM1N11, EC-xM1N12, EC-XM1N13, EC-xM1N111 participating therein in accordance with FIG. 1 in each case the cluster-specific energy-prosumer-related evaluation/-optimization is carried out, 2) the evaluation/optimization is carried out such that the energy cluster behaves actively with regard to each evaluation/optimization to be carried out in the energy network, in a network-oriented and network-useful manner, in particular with the aim of stabilizing network operation, 3) the evaluation/optimization in accordance with FIG. 3 is carried out in such a way that, in the sense of an open-loop-controlled, closed-loop-controlled, target-oriented and/or self-learning principle, dynamically and substantially continuously, the network data ND and network structure data NSD of the energy network, the "energy prosumer" structure/profile data EPSPD from the participating energy prosumer in the energy cluster, the requirement profile data APD of superordinate energy clusters and the energy-specific market and economy data MWD, which are all received via the communication device KE, are evaluated for the generation of supply-/incentive-oriented control data STD.

Once the control data STD have been generated in the course of the evaluation explained above, they can be interrogated by the energy prosumer in the energy cluster at regular time intervals or depending on the "energy prosumer"-specific power and storage state. Alternatively, however, it is also possible for the control data STD to be transferred as a command to the energy prosumer.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for managing control targets, comprising:
providing an energy network, wherein the energy network has a multiplicity of network connection levels, wherein each network connection level of the multiplicity of network connection levels is coupled to a power market indirectly or directly for supply, conversion, storage, infeed, distribution and/or consumption of regional energy obtained centrally and/or of local energy obtained in a decentralized manner,
providing, for each network connection level of the multiplicity of network connection levels, at least one energy cluster with at least one energy prosumer which is suitable for technical communication in the at least one energy cluster and which does at least one of: (i) produces local energy obtained in a decentralized manner and (ii) consumes local or regional energy, wherein the at least one energy prosumer is at least one of an energy network subscriber and a sub-energy cluster which is contained in the at least one energy cluster and is interlinked with the at least one energy cluster, and wherein supply, conversion, storage, infeed, distribution and/or consumption of energy within the at least one energy cluster is effected across clusters and/or across network connection levels between the at least one energy cluster and the power market,
establishing an energy-prosumer-related incentive-supply model for the at least one energy prosumer;
generating control data for the at least one energy prosumer, based on the energy-prosumer-related incentive-supply model, dynamically and substantially continuously communicated network data and network structure data of the energy network, structure/profile data from the at least one energy prosumer in the at least one energy cluster, requirement profile data of superordinate energy clusters, and energy-specific market and economy data, wherein the generated control data is specific to the last least one energy cluster,
wherein the generating results in the at least one energy cluster behaving actively with regard to an optimization of the energy network.

2. The method as claimed in claim 1, wherein the control data are interrogated by the at least one energy prosumer in the at least one energy cluster at regular time intervals or depending on specific power and storage state or are transmitted as a command to the at least one energy prosumer.

3. The method as claimed in claim 1, wherein the generating is performed by an evaluation/optimization process which is hosted and proceeds centrally in at least one of the at least one energy cluster and the sub-energy cluster.

4. A computer program product, comprising a computer readable hardware storage device having computer readable program code stored therein, said program code executable by a processor of a computer system to implement a method for managing control targets the method comprising:

providing an energy network, wherein the energy network has a multiplicity of network connection levels, wherein each network connection level of the multiplicity of network connection levels is coupled to a power market indirectly or directly for supply, conversion, storage, infeed, distribution and/or consumption of regional energy obtained centrally and/or of local energy obtained in a decentralized manner, providing, for each network connection level of the multiplicity of network connection levels contains at least one energy cluster with at least one energy prosumer which is suitable for technical communication in the energy cluster and which does at least one of: (i) produces local energy obtained in a decentralized manner and (ii) consumes local or regional energy, wherein the at least one energy prosumer is at least one of an energy network subscriber and a sub-energy cluster which is contained in the at least one energy cluster and is interlinked with the at least one energy cluster, and wherein supply, conversion, storage, infeed, distribution and/or consumption of energy within the at least one energy cluster is effected across clusters and/or across network connection levels between the at least one energy cluster and the power market, establishing an energy-prosumer-related incentive-supply model for the at least one energy prosumer;

generating control data for the at least one energy prosumer, based on the energy-prosumer-related incentive-supply model, dynamically and substantially continuously communicated network data and network structure data of the energy network, structure/profile data from the at least one energy prosumer in the at least one energy cluster, requirement profile data of superordinate energy clusters, and energy-specific market and economy data, wherein the generated control data is specific to the last least one energy cluster, wherein the generating results in the at least one energy cluster behaving actively with regard to an optimization of the energy network.

5. The computer program product as claimed in claim 4, wherein the control data are interrogated by the at least one energy prosumer in the at least one energy cluster at regular time intervals or depending on specific power and storage state or are transmitted as a command to the at least one energy prosumer.

6. The computer program product as claimed in claim 4, wherein the processor and the program module are configured such that the generating is performed by an evaluation/optimization process.

7. An apparatus for managing control targets when controlling supply, conversion, storage, infeed, distribution and/or consumption of energy in an energy network having a multiplicity of network connection levels, wherein each network connection level of the multiplicity of network connection levels is coupled to a power market indirectly or directly for supply, conversion, storage, infeed, distribution and/or consumption of regional energy obtained centrally and/or of local energy obtained in a decentralized manner, wherein each network connection level of the multiplicity of network connection levels contains at least one energy cluster with at least one energy prosumer which is suitable for technical communication in the at least one energy cluster and which does at least one of: (i) produces local energy obtained in a decentralized manner and (ii) consumes local or regional energy, wherein the at least one energy prosumer is at least one of an energy network subscriber and a sub-energy cluster which is contained in the at least one energy cluster and is interlinked with the at least one energy cluster, and wherein supply, conversion, storage, infeed, distribution and/or consumption of energy within the at least one energy cluster is effected across clusters and/or across network connection levels between the at least one energy cluster and the power market, the apparatus comprising:

a control device, which comprises a computer program product, comprising a computer readable hardware storage device having computer readable program code stored therein, said program code executable to implement a method for managing control targets comprising a nonvolatile, readable memory, in which processor-readable control program instructions of a program module that carries out the management of the control targets are stored, and a processor connected to the memory, said processor executing the control program instructions of the program module, wherein the control device is connected to a communication device and with the communication device forms a common functional unit, and wherein the control device:

establishes an energy-prosumer-related incentive-supply model for the at least one energy prosumer;

generates control data for the at least one energy prosumer, based on the energy-prosumer-related incentive-supply model, dynamically and substantially continuously communicated network data and network structure data of the energy network, structure/profile data from the at least one energy prosumer in the at least one energy cluster, requirement profile data of superordinate energy clusters, and energy-specific market and economy data, wherein the generated control data is specific to the last least one energy cluster, wherein generating results in the at least one energy cluster behaving actively with regard to an optimization of the energy network.

8. The apparatus as claimed in claim 7, wherein the control unit and the communication device are configured such that the control data are interrogated by the at least one energy prosumer in the at least one energy cluster at regular time intervals or depending on the specific power and storage state or are transmitted as a command to the at least one energy prosumer.

9. The apparatus as claimed in claim 7, wherein the control unit is configured such that the generating is performed by means of an evaluation/optimization process.

10. The apparatus as claimed in claim 7, wherein the communication device is configured as a communication interface to the at least one energy prosumer, which communication interface, for a data transfer, for the transmission or reception of data to or from the at least one energy prosumer, transmits or receives data on a physical layer in accordance with the ISO/OSI reference model on the basis of a point-to-point connection in a line-based fashion or via a free space connection, and on a network layer and transport layer in accordance with the ISO/OSI reference model on the basis of an end-to-end connection between end systems of a communication network in a circuit-switched or packet-switched fashion.

11. The apparatus as claimed in claim 7, wherein a server is arranged in an interface of the energy network, the interface of the energy network being at least one of a network distribution box, a network transformer station, a network substation.

12. An energy cluster service system for managing control targets when controlling supply, conversion, storage, infeed, distribution and/or consumption of energy in an energy network having a multiplicity of network connection levels,
  wherein each network connection level of the multiplicity of network connection levels is coupled to a power market indirectly or directly for supply, conversion, storage, infeed, distribution and/or consumption of regional energy obtained centrally and/or of local energy obtained in a decentralized manner,
  wherein each network connection level of the multiplicity of network connection levels contains at least one energy cluster with at least one energy prosumer which is suitable for technical communication in the at least one energy cluster and which does at least one of: (i) produces local energy obtained in a decentralized manner and (ii) consumes local or regional energy, wherein the at least one energy prosumer is at least one of an energy network subscriber and a sub-energy cluster which is contained in the at least one energy cluster and is interlinked with the at least one energy cluster, and supply, conversion, storage, infeed, distribution and/or consumption of energy within the at least one energy cluster is effected across clusters and/or across network connection levels between the at least one energy cluster and the power market, the energy cluster service system comprising:
  the apparatus as claimed in claim 7 and a communication apparatus, which is connected to the apparatus for data transfer and forms a common functional unit.

13. The energy cluster service system as claimed in claim 12, wherein the functional unit formed jointly from the apparatus and the communication apparatus is configured such that for the data transfer data are transferred on a physical layer in accordance with the ISO/OSI reference model on the basis of a point-to-point connection in a line-based or via a free space connection, and on a network layer and transport layer in accordance with the ISO/OSI reference model on the basis of an end-to-end connection between end systems of a communication network in a circuit-switched or packet-switched fashion.

* * * * *